United States Patent
Soula et al.

(10) Patent No.: US 8,654,003 B2
(45) Date of Patent: Feb. 18, 2014

(54) OMNIDIRECTIONAL PSEUDO-ANTENNA FOR INTERROGATOR OR SYSTEM ALLOWING THE INTERROGATION RESPONSE AND/OR PASSIVE LISTENING FUNCTIONS

(75) Inventors: Stéphane Soula, Laval (FR); Claude Provost, Laval (FR)

(73) Assignee: Thales, Neuilly sur Seine (FR)

( * ) Notice: Subject to any disclaimer, the term of this patent is extended or adjusted under 35 U.S.C. 154(b) by 727 days.

(21) Appl. No.: 12/668,512

(22) PCT Filed: Jul. 11, 2008

(86) PCT No.: PCT/EP2008/059064
§ 371 (c)(1),
(2), (4) Date: Nov. 22, 2010

(87) PCT Pub. No.: WO2009/007444
PCT Pub. Date: Jan. 15, 2009

(65) Prior Publication Data
US 2011/0090053 A1   Apr. 21, 2011

(30) Foreign Application Priority Data
Jul. 12, 2007  (FR) ...................................... 07 05057

(51) Int. Cl.
*G01S 13/00*  (2006.01)
*G01S 13/74*  (2006.01)
*G01S 13/78*  (2006.01)

(52) U.S. Cl.
USPC .................. 342/45; 342/29; 342/30; 342/42; 342/147

(58) Field of Classification Search
USPC ..................... 342/29–51, 147–158
See application file for complete search history.

(56) References Cited

U.S. PATENT DOCUMENTS

| | | | |
|---|---|---|---|
| 3,594,811 A * | 7/1971 | Pierrot | 342/350 |
| 5,173,700 A * | 12/1992 | Chesley | 342/17 |
| 5,231,413 A * | 7/1993 | Dubois | 343/833 |
| 5,241,318 A * | 8/1993 | Howard | 342/149 |
| 5,402,130 A * | 3/1995 | Sherman | 342/152 |
| 5,485,162 A * | 1/1996 | Sezai | 342/378 |
| 5,600,326 A * | 2/1997 | Yu et al. | 342/17 |
| 5,619,206 A * | 4/1997 | Cole et al. | 342/37 |
| 6,377,212 B1 * | 4/2002 | Kinghorn et al. | 342/380 |
| 7,385,560 B1 * | 6/2008 | Maloratsky et al. | 343/705 |
| 7,508,343 B1 * | 3/2009 | Maloratsky et al. | 342/374 |
| 2006/0284759 A1 * | 12/2006 | Wahl | 342/45 |
| 2007/0279276 A1 * | 12/2007 | Conn et al. | 342/80 |
| 2008/0030395 A1 * | 2/2008 | Knick et al. | 342/80 |
| 2008/0284637 A1 * | 11/2008 | Blessing et al. | 342/30 |
| 2011/0102236 A1 * | 5/2011 | Wajer | 342/45 |

FOREIGN PATENT DOCUMENTS

EP      0643439 A1   3/1995

* cited by examiner

*Primary Examiner* — Peter Bythrow
(74) *Attorney, Agent, or Firm* — Stroock & Stroock & Lavan LLP

(57) ABSTRACT

System and method making it possible to operate in an interrogator mode and/or in a passive listening mode wherein it comprises in combination at least the following elements:
  an antenna (6) having a given aperture sector,
  a control means (31) making it possible to toggle the system into a first interrogator operating mode using a first given angle sector or into a second passive listening operating mode using a second angle sector of greater value than the first,
  means (23) making it possible to add together the signals received on the sum pathway and on the difference pathway of the antenna in the case of the passive listening operating mode.

6 Claims, 4 Drawing Sheets

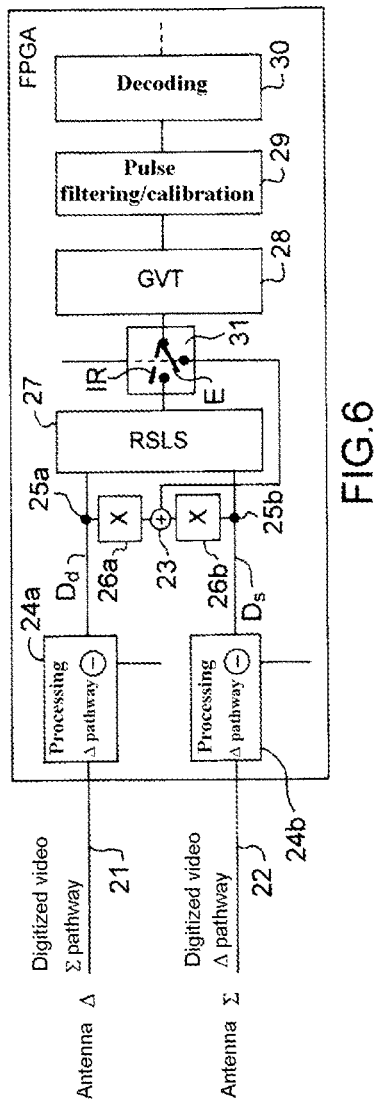
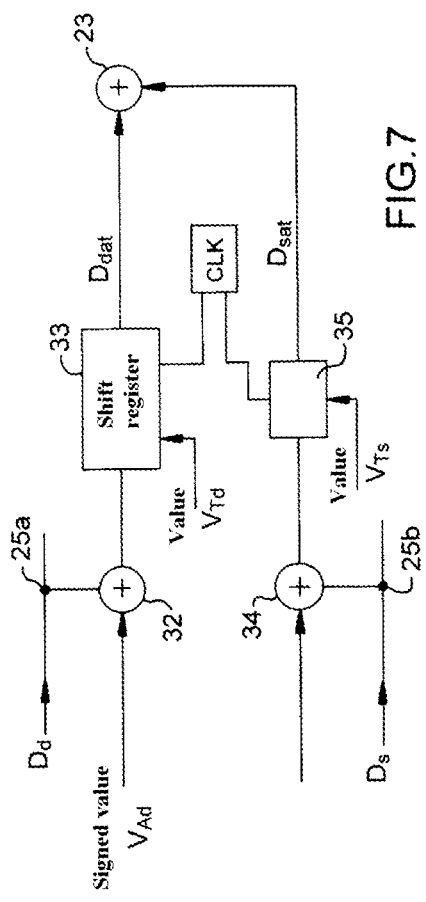

OMNIDIRECTIONAL PSEUDO-ANTENNA FOR INTERROGATOR OR SYSTEM ALLOWING THE INTERROGATION RESPONSE AND/OR PASSIVE LISTENING FUNCTIONS

CROSS-REFERENCE TO PRIOR APPLICATION

This is the U.S. National Phase Application under 35 U.S.C. §371 of International Application no. PCT/EP2008/059064 filed Jul. 11, 2008, which application claims the benefit of French Patent Application No. 07 05057, filed Jul. 12, 2007, both of which are incorporated by reference herein. The International Application was published in French on Jan. 15, 2009 as WO/2009/007444 under PCT Article 21 (2).

TECHNICAL FIELD

The invention relates notably to an identification system equipped with an interrogator device taking the form of an antenna having a given aperture angle. It relates, for example, to interrogator/responder systems that have to operate in the following two modes: the interrogator/responder mode and the passive listening mode.

BACKGROUND

Systems for interrogating and identifying an object are equipped with an antenna having a given angle aperture making it possible to interrogate in a direction (emit a directional beam) and in a controlled angle sector. These interrogator or interrogator/responder systems on account of the directivity of their antenna do not generally make it possible to carry out passive listening. Indeed, the angle sector over which they operate is limited. Moreover, the low emission rate of unsolicited responders (better known as "squitters" (~1 Hz)), allied with the use of traditional interrogator/responder or IFF (Identification Friend and Foe) antennas (sum pathway Σ/difference pathway Δ with an aperture of ~10°) implies that, to chart the aerial situation, an IFF interrogator customarily used in the prior art must perform numerous antenna revolutions. The response of the "squitter" will be received only when it is situated in a precise angle sector and the time for observing its response will therefore be limited (duration for which the response is observed).

Current antenna systems (Σ/Δ antenna patterns necessary for the sidelobe suppression processing, RSLS for short) used by IFF interrogators are therefore completely unsuitable for the squitters' listening function which requires an omnidirectional antenna.

Various solutions are currently known in the prior art. Various examples are given in relation to FIGS. 1, 2 and 3 which comprise in a common manner a digital core 1, a signal processing device, having notably the function of eliminating the responses of the antenna sidelobes or RSLS, for decoding the information of the signal received by the system, a reception pathway 4 corresponding to the sum pattern of the antenna, a reception pathway 5 corresponding to the difference pattern of the antenna 6 with which the responder interrogator is equipped.

A first solution for responding to the passive listening requirement is illustrated in FIG. 1. It consists in adding a reception pathway 7 and an omnidirectional antenna 8 dedicated to the listening function, as well as a device 3 for processing and decoding the information received on this extra pathway. The addition of such an antenna and of a dedicated reception pathway gives rise to the presence of a dedicated digital processing pathway. These additions engender problems of complexity of installation, costs (consumption of the FPGA digital processing devices, etc.)

A second solution illustrated in FIG. 2 relies on the addition of a switching device 9 making it possible to use an omnidirectional antenna 10 on the sum reception pathway of the antenna customarily used. Such a device gives rise to the addition of an omnidirectional antenna and an increase in the complexity of the radiofrequency function and of installing the assembly.

A third solution known to the Applicant is illustrated in FIG. 3. It consists in adding an extra processing chain 11 on the pathway of the sum pattern or Δ. In the example of FIG. 3, the addition is done on the difference reception pathway or Δ. This leads to an increase in the complexity (with 2 decoding pathways) of the extra processing module on the pathway as well as limitations related to the "blind" zone on the axis of the antenna Δ.

SUMMARY OF THE INVENTION

The system according to the invention relies on a new approach which to consists in creating an omnidirectional pseudo-antenna on the basis of a directional antenna (having a given aperture a for the given antenna pattern) and of an appropriate processing chain making it possible to use the system in a first interrogator mode or in a second passive listening mode. In the case where the system is an IFF system, by using the radiation patterns of the Σ and Δ antennas of IFF interrogators (radiation pattern of the Δ antenna overlapping that of the Σ antenna outside of the main lobe of the antenna Σ) and by means of a processing performed in the interrogator, the invention makes it possible to obtain an effective listening station (360° listening instead of the ~8° of aperture of a standard system).

The object of the invention relates to a system making it possible to operate in an interrogator mode and/or in a passive listening mode characterized in that it comprises in combination at least the following elements:

an antenna having a given aperture sector α,
a control means making it possible to toggle the system into a first interrogator operating mode using a first given angle sector or into a second passive listening operating mode using a second angle sector of greater value than the first,
means making it possible to add together the signals received on the sum pathway and on the difference pathway of the antenna in the case of the passive listening operating mode.

The system and the method according to the invention offer notably the following advantages:

of transforming at lesser cost a Mode S IFF interrogator into an ADS-B listening station without any modification of the installation (addition of omni antenna, RF switching, reception pathway) or hardware modification of the interrogator,
of carrying out the new function with a simple FPGA modification (addition of 2 buses and injection of the resulting signal into the normal processing chain),
of adding configurable processings making it possible to adjust (time domain and amplitude) the pathways,
of decreasing the acquisition time of passive response devices or "squitters" of an interrogator devoid of any omnidirectional antenna for example, from a few tens of seconds to a few seconds.

It also relates to a method for allowing a device provided with at least one antenna having a given sector to be made to operate in interrogator mode and/or in passive listening mode characterized in that it comprises at least the following steps: select the interrogator mode or the passive listening mode, if the mode selected is the interrogator mode, then transmit the signals received on the sum pathway of the antenna and on the difference pathway to a processing chain suitable for processing the signals received, if the mode selected is the passive listening mode, then transmit the signals received on the sum pathway of the antenna and on the difference pathway to an adder.

BRIEF DESCRIPTION OF DRAWINGS

Other characteristics and advantages of the present invention will be more apparent on reading the description which follows of an exemplary embodiment given by way of wholly nonlimiting illustration in conjunction with the figures which represent.

DETAILED DESCRIPTION OF PREFERRED EMBODIMENTS

In order to better explain the principle of the system according to the invention, the description is given for a system used to perform interrogations/response or passive listening, designated IFF system in the subsequent description.

Figure 1:
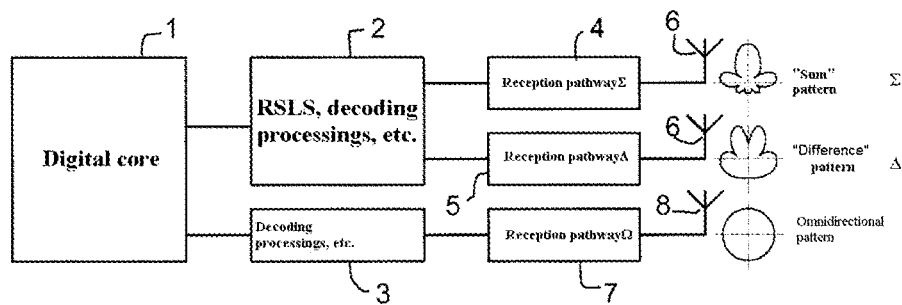
FIGS. 1 to 4, examples of a system and of a system architecture according to the prior art, FIG. 5, the detail of the processing of the signals and of control of the operating mode of the system, FIG. 6, a detail of the processing block of FPGA type, FIG. 7, the detail of the part added to the interrogator system allowing it to be operated as a passive listening system, FIG. 8, the plot of various signals taken at various points of the IFF system.
Figure 2:
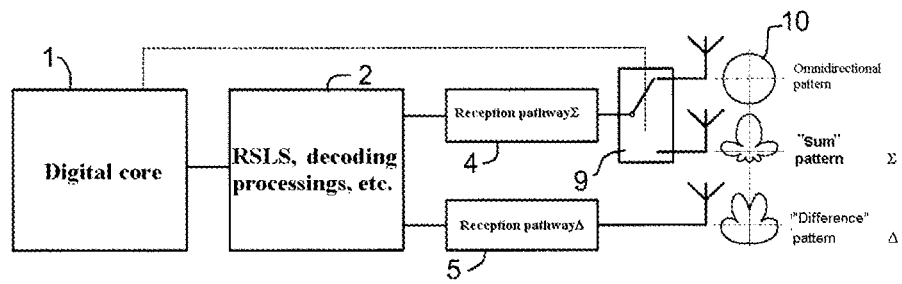
Figure 3:
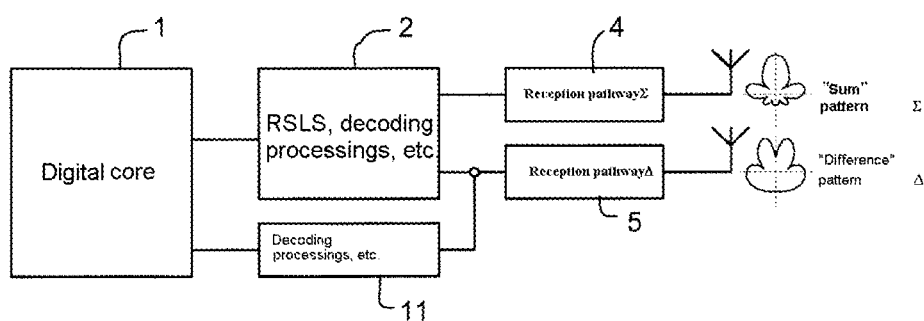
Figure 4:
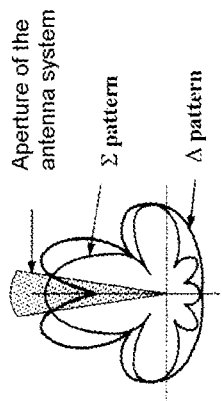

FIG. 4 shows the patterns for an antenna customarily used in IFF interrogators, with a given antenna aperture α. The antenna aperture corresponds to about 10°. The antenna 6 comprises a sum antenna pattern Σ and a difference pattern Δ.

In a standard operating mode for the IFF system, the video pathways arrive in a digital device 20 for utilization. The idea is to dispatch to the device for utilizing the videos, no longer just the Sum pathway 21, the difference pathway 22, but the addition 23 of the signals of the Σ and Δ pathways. The digital processing 20 adds together the information (digitized video signals) arising from the receivers situated on the Σ and Δ antennas, to obtain 360° coverage.

The devices for decoding the mode S responses therefore no longer utilize just the information arising from the responders situated in the Effective Band Width (EBW) but the sum of the signals received on the 2 antenna patterns Σ and Δ.

Figure 5:
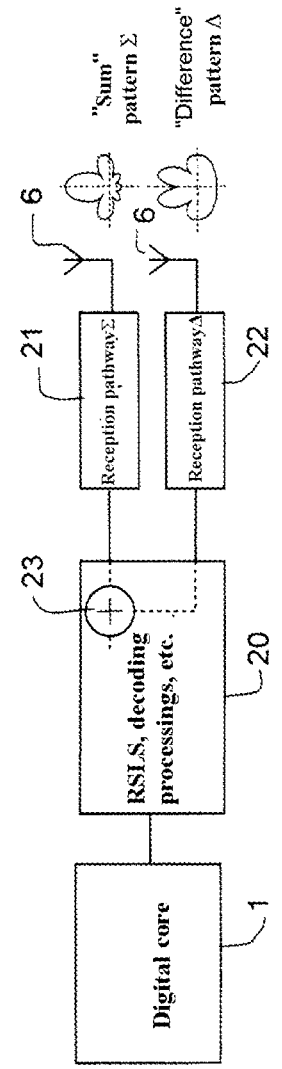

FIG. 5 shows diagrammatically in a functional manner the system according to the invention. The signals arrive at receivers situated on the antenna. They are thereafter separated on two pathways. A first digitized pathway 21 corresponds to the sum reception pathway and a second digitized pathway 22 to the difference reception pathway. The two reception pathways are linked to the processing device 20 detailed in FIG. 6.

The processing device 20 (FIG. 6) comprises a means 31 making it possible to select the operating mode of the system; interrogator/responder mode or passive listening mode.

In the case where the operating mode chosen is the interrogator-responder mode, that is to say the control device 31 is placed in the IR position represented dashed in FIG. 6. The signal received on the digitized pathway 21 passes into a processing device 24a having notably the function of eliminating the signals that do not have a sufficient amplitude level, for example. The comparison is performed with respect to a fixed threshold value. The thresheld signal Dd is transmitted directly to the device 27 making it possible to undertake the lobe suppression processing known for short as RSLS for Receiver Side Lobe Suppression, device making it possible by means of a configurable threshold, to eliminate a response which is received on the difference pathway Δ with a level greater than the level of this same response on the sum pathway Σ. The value of the RSLS makes it possible to fix the value of the effective bandwidth, and then the device 28 making it possible to perform the processings of time-varying gain known by the abbreviation GVT. The device 28 comprises plateau duration and plateau level parameters making it possible notably to fix the effective bandwidth or EBW value. These two processings are known to the person skilled in the art and will not therefore be detailed. The signals are thereafter filtered by a device for filtering/calibrating the pulses 29, and then the decoding device 30. These various elements are integrated into a processing device of FPGA type. The signal received on the digitized pathway 22 passes into a processing device 24b having notably the function of eliminating the signals that cannot be lower than a given threshold value. The signals are transmitted to the device 27 so as to be processed in a similar manner to the thresheld signal Dd as has been described previously.

When the user wishes to make the system operate in the passive listening mode, he acts on the control of the antenna to place it in position E. In this case, the signals received on the difference pathway Dd and on the sum pathway Ds are transmitted at the level of the points 25a and 25b to a device 26a, 26b and 23 whose first function is notably to add them together before transmitting them to the processing chain comprising the aforesaid device 28 making it possible to perform the GVT processing, of the device for filtering and calibrating the pulses and of the decoder 30 of the information contained in the sum signal. The function of this device detailed in FIG. 7 is also to adjust temporally and/or in amplitude the digitized signals received on the sum and difference pathways. The digital processing thus makes it possible to obtain a coverage of 360°.

FIG. 7 shows diagrammatically an exemplary structure for the device 26a, 26b and 23 of FIG. 6. The example has been given when it is desired to adjust the signals in amplitude and temporally. For this purpose, the digitized video signal received on the difference pathway is diverted at the level of the point 25a in order to be added 32 to a signed value VAd corresponding to the shift in amplitude that it is desired to introduce. The signal adjusted in amplitude is thereafter dispatched to a shift register 33 which also receives an unsigned value of temporal shift VTd to be added to the signal. The signal adjusted in amplitude and in time, Ddat is thereafter transmitted to the summator 23 to be added to the digitized video signal received on the sum pathway which has undergone similar processings.

The signal Ds is adjusted in amplitude by adding thereto 34 a signed value VAs corresponding to the shift in amplitude to be applied, and then this signal is transmitted to a second shift register 35 which receives a signed value VTd the function of which is to adjust the signal temporally. The signal, denoted Dsat, arising from these processings is then added to the signal Ddat, as has been indicated previously.

A clock 36 is used to achieve the timeout at the level of the shift registers. This clock can be the FPGA's clock used to synchronize the various operations performed within the FPGA.

The digital processings are performed in FPGAs or ASICs, for example.

Figure 8:
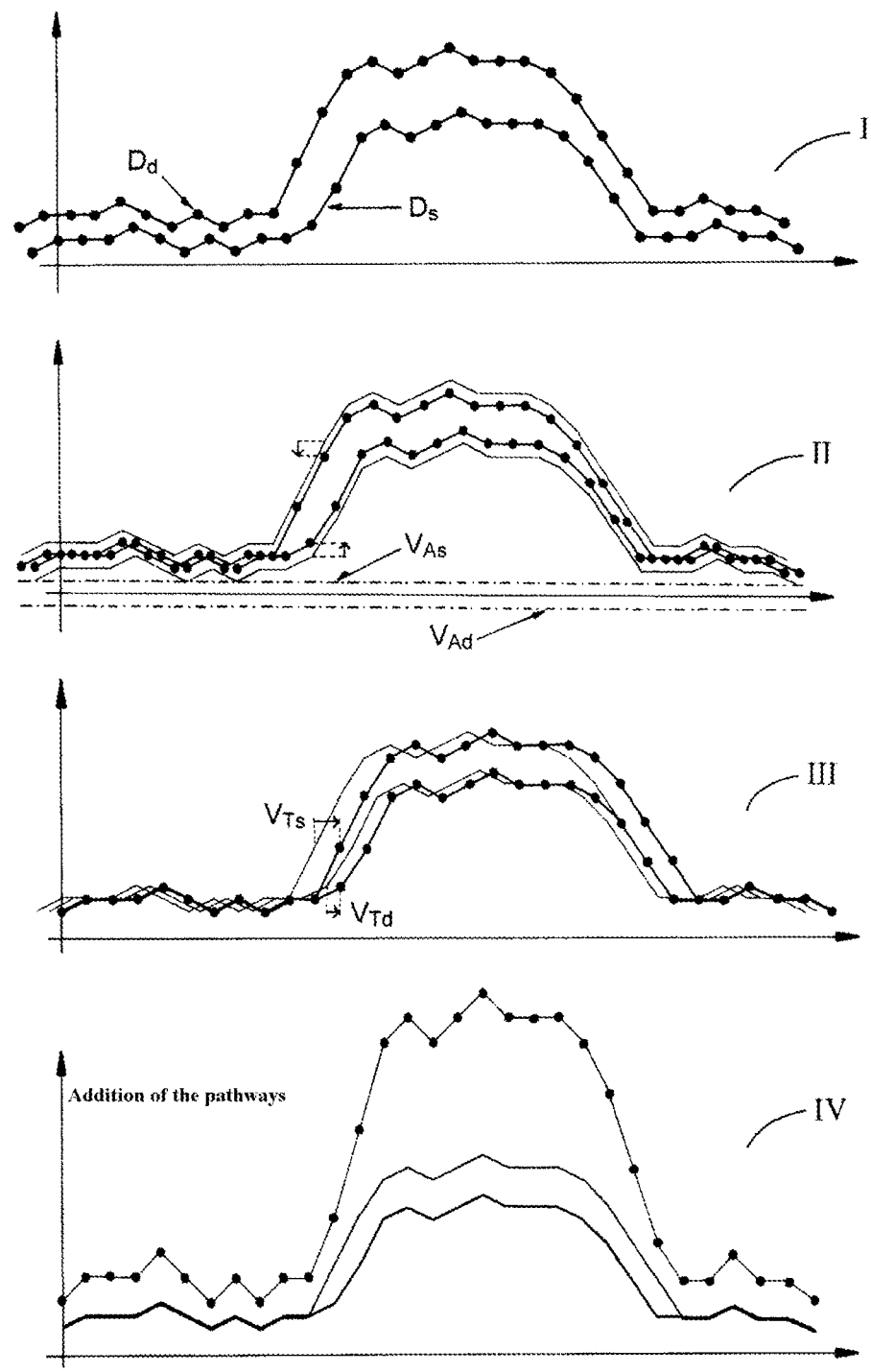

In FIG. 8, the trends corresponding to the signals discussed above, taken at various points of the system, are plotted in amplitude, time diagrams.

The first graph I represents the digitized video signals of the sum pathway and of the difference pathway entering the processing device 20.

The second graph II represents the amplitude adjusting for the signals of the first graph and the signals arising from the adders 32, 34. The adjusting makes it possible to set the noise level of the 2 pathways to the same value.

On the third graph III are represented the signals adjusted in amplitude and temporally and the time shifts introduced by the configurable-shift registers. The temporal adjusting makes it possible to avoid an artificial widening of the pulses during their addition.

The fourth graph IV represents the sum digitized video signal, the difference digitized video signal, and the sum of these two signals adjusted in this example in time and in amplitude, said signal being processed thereafter by the FPGA processing chain.

The adjustments in amplitude and in time are performed only in certain cases. Other processings executed on the signals can be envisaged without departing from the scope of the invention.

The invention claimed is:

1. A system making it possible to operate in an interrogator mode, a passive listening mode or both, wherein the system comprises in combination at least the following elements:
    an antenna having a given aperture sector $\alpha$,
    a control means adapted for toggling the system into an interrogator operating mode using a first angle sector or into a passive listening operating mode using a second angle sector of greater value than the first angle sector,
    means configured to add together information arising from receivers situated on sum and difference pathways $\Sigma$ and $\Delta$ of the antenna so as to obtain 360° coverage when in the passive listening operating mode; and
    a filter configured to eliminate information of lower amplitude than a given threshold value.

2. The system as claimed in claim 1, further comprising means of amplitude or temporal adjusting of the information received on each of the sum and difference pathways in the case of the operation in passive listening.

3. The system as claimed in claim 1, wherein the antenna is an interrogator/responder antenna.

4. A method for allowing a device provided with at least one antenna having a given sector to be made to operate in interrogator mode, in passive listening mode or both, wherein the method comprises at least the following steps:
    selecting the interrogator mode or the passive listening mode,
        if the mode selected is the interrogator mode, then transmitting signals received on a sum pathway of the antenna and on a difference pathway of the antenna to a processing chain suitable for processing the signals received,
        if the mode selected is the passive listening mode, then utilizing processing hardware to add together the signals arising from receivers situated on the sum pathway and on the difference pathway $\Sigma$ and $\Delta$ of the antenna so as to obtain 360° coverage; and
        filtering the received signals so as to eliminate signals of insufficient amplitude.

5. The method as claimed in claim 4, wherein before summing the signals received on the sum pathway and the difference pathway, performing amplitude or temporal adjusting of said signals.

6. The method as claimed in claim 4, wherein an interrogator/responder mode and a passive listening mode are used.

\* \* \* \* \*